(12) United States Patent
Boyes

(10) Patent No.: US 9,441,680 B2
(45) Date of Patent: Sep. 13, 2016

(54) CLUTCHED DRIVEN DEVICE AND ASSOCIATED CLUTCH MECHANISM

(71) Applicant: Litens Automotive Partnership, Woodbridge (CA)

(72) Inventor: Andrew M. Boyes, Aurora (CA)

(73) Assignee: Litens Automotive Partnership, Woodbridge, ON (CA)

( * ) Notice: Subject to any disclaimer, the term of this patent is extended or adjusted under 35 U.S.C. 154(b) by 16 days.

(21) Appl. No.: 14/356,014

(22) PCT Filed: Nov. 6, 2012

(86) PCT No.: PCT/CA2012/001022
§ 371 (c)(1),
(2) Date: May 2, 2014

(87) PCT Pub. No.: WO2013/067621
PCT Pub. Date: May 16, 2013

(65) Prior Publication Data
US 2014/0291104 A1    Oct. 2, 2014

Related U.S. Application Data

(60) Provisional application No. 61/556,372, filed on Nov. 7, 2011.

(51) Int. Cl.
*F16D 27/105*  (2006.01)
*F02B 67/06*  (2006.01)
(Continued)

(52) U.S. Cl.
CPC ............ *F16D 27/105* (2013.01); *F02B 67/06* (2013.01); *F16D 13/12* (2013.01); *B60K 25/00* (2013.01); *F16D 2027/005* (2013.01)

(58) Field of Classification Search
CPC ........... F16D 27/105; F16D 2027/005; F04C 29/0064
See application file for complete search history.

(56) References Cited

U.S. PATENT DOCUMENTS

2008/0041686 A1* 2/2008 Hoshino ............... F16D 27/105
                                                         192/3.56
2010/0116617 A1* 5/2010 Serkh ..................... F16H 55/36
                                                         192/41 S
(Continued)

FOREIGN PATENT DOCUMENTS

CN    102216639 A    10/2011
JP    2004-084744 A   3/2004
(Continued)

OTHER PUBLICATIONS

English language machine translation of JP 4075674 B2, downloaded from EPO.org on Jan. 29, 2016.*

(Continued)

*Primary Examiner* — Richard Lorence
(74) *Attorney, Agent, or Firm* — Millman IP Inc.

(57) ABSTRACT

A driven accessory comprising a first rotary clutch portion, a second rotary clutch portion, a wrap spring and an actuator. The actuator is selectively operable for generating a force that is applied to a second end of the wrap spring. The actuator includes an actuator input member that is rotatable about a rotary axis relative to the first rotary clutch portion. The actuator input member is axially movable along the rotary axis between a first position, in which the actuator input member is drivingly engaged to the first rotary clutch portion to cause the wrap spring to uncoil against a clutch surface on the first rotary clutch portion such that rotary power is transmitted between the first rotary clutch portion and the second rotary clutch portion, and a second position in which the actuator input member is disengaged from first rotary clutch portion.

16 Claims, 13 Drawing Sheets

(51) Int. Cl.
*F16D 13/12* (2006.01)
*B60K 25/00* (2006.01)
*F16D 27/00* (2006.01)

(56) References Cited

U.S. PATENT DOCUMENTS

| 2010/0230227 | A1 | 9/2010 | Parsons et al. | |
| 2014/0076683 | A1* | 3/2014 | Williams | B60K 25/02 |
| | | | | 192/41 S |
| 2014/0238809 | A1* | 8/2014 | Boyes | F02B 67/06 |
| | | | | 192/75 |

FOREIGN PATENT DOCUMENTS

| JP | 2004-204837 | A | | 7/2004 |
| JP | 4075674 | B2 | * | 4/2008 |
| JP | 4155137 | B2 | | 9/2008 |
| WO | 2012024790 | A2 | | 3/2012 |
| WO | 2012135942 | A1 | | 10/2012 |

OTHER PUBLICATIONS

PCT/CA2012/001022, Search Report and Written Opinion, Feb. 14, 2013, ISA.

International Preliminary Report on Patentability for PCT/CA2012/001022, May 22, 2014, ISA.

CN 201280054765.2, Chinese Office Action & Search Report (with English translation), Nov. 4, 2015.

* cited by examiner

CLUTCHED DRIVEN DEVICE AND ASSOCIATED CLUTCH MECHANISM

CROSS-REFERENCE TO RELATED APPLICATIONS

This application claims the benefit of U.S. Provisional Patent Application No. 61/556,372 filed Nov. 7, 2011, the disclosure of which is incorporated by reference as if fully set forth in detail herein.

INTRODUCTION

The present disclosure relates to a clutched driven device and an associated clutch mechanism.

BACKGROUND

This section provides background information related to the present disclosure which is not necessarily prior art.

It is often desired to power a device with rotary power that is transmitted from a prime mover either directly or through an endless power transmitting element, which could employ a belt, a chain and/or a toothed gear. Such devices could, for example be connected to the engine of a motor vehicle via an accessory drive or a timing drive and could include a pump (e.g., water pump, vacuum pump, power steering pump, hydraulic pump, air compressor, air conditioning compressor), a means for generating electricity (e.g., alternator, generator, starter-alternator, starter-generator), a supercharger, and/or a fan, for example.

It will be appreciated that in situations when the output of the device is not needed or desired, operation of the device will be associated with reduced efficiency of the prime mover. In an automotive context for example, it is not necessary to constantly operate an air conditioning compressor and as such, the operation of the air conditioning compressor when it is not needed reduces the overall fuel efficiency of the engine. To overcome this drawback, it was known in the art to provide a clutch to selectively operate the device. Such clutches typically required some sort of power, usually electrical power, to permit rotary power to be transmitted through the clutch to drive the device. While such clutches are suitable for their intended purposes, such clutches are nonetheless susceptible to improvement.

SUMMARY

This section provides a general summary of the disclosure, and is not a comprehensive disclosure of its full scope or all of its features.

In one form, the present teachings provide a driven accessory that includes first and second rotary clutch portions, a wrap spring, and an actuator. The first rotary clutch portion is disposed about a rotary axis and is configured to receive a rotary input. The first rotary clutch portion defines a clutch surface. The second rotary clutch portion is disposed about the rotary axis and is configured to be coupled to an input shaft. The wrap spring has a first end, a second end and a plurality of helical coils directly connected to the first and second ends. At least a portion of the plurality of helical coils engages the clutch surface. The wrap spring is configured to selectively transmit rotary power between the first rotary clutch portion and the second rotary clutch portion. More specifically, the rotary power is received by the helical coils from the first rotary clutch portion and is transmitted through the first end. The actuator is selectively operable for generating a drag force that is applied to the second end of the wrap spring. The actuator includes an actuator input member that is rotatable about the rotary axis relative to the first rotary clutch portion. The actuator input member is axially movable along the rotary axis between a first position, in which the actuator input member is drivingly engaged to the first rotary clutch portion to cause the wrap spring to uncoil against the clutch surface such that rotary power is transmitted between the first rotary clutch portion and the second rotary clutch portion, and a second position in which the actuator input member is disengaged from first rotary clutch portion. Rotary power that is output from the wrap spring to the second rotary clutch portion is transmitted through an axial end face of a wire that forms the first end of the wrap spring. The axial end face abuts an abutment surface formed on the second rotary clutch portion. The actuator input member and the second end of the wrap spring are coupled such that the actuator input member is axially movable independently of the second end of the wrap spring.

In another form, the present teachings provide a method of operating a driven accessory. The method includes: providing a clutched, driven accessory having a clutch assembly and a variable displacement pump; controlling a displacement of the variable displacement pump to a predetermined low level; engaging the clutch assembly to transmit rotary power to an input member of the variable displacement pump; and increasing the displacement of the variable displacement pump after the clutch assembly has been engaged to a desired displacement.

In still another form, the present teachings provide a method of operating a driven accessory. The method includes: providing a clutched, driven accessory having a clutch assembly and a variable displacement pump; operating the clutch assembly to transmit rotary power to the variable displacement pump; controlling a displacement of the variable displacement pump to a predetermined high level while the variable displacement pump is operating; and disengaging the clutch assembly to halt transmission of rotary power to an input member of the variable displacement pump.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way. Similar or identical elements are given consistent identifying numerals throughout the various figures.

Corresponding reference numerals indicate corresponding parts throughout the several views of the drawings.

DETAILED DESCRIPTION OF THE VARIOUS EMBODIMENTS

Figure 1:
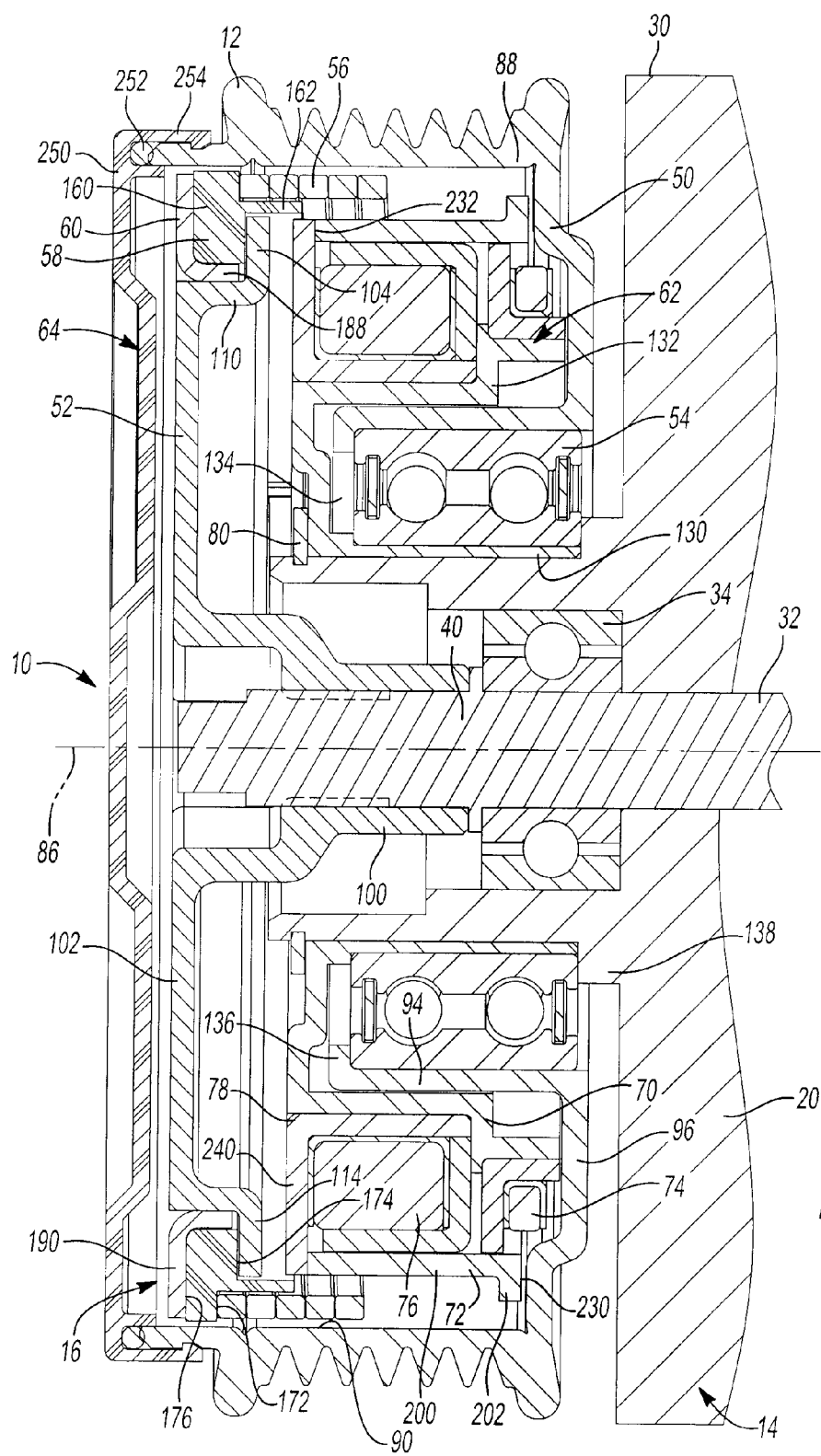
FIG. 1 is a longitudinal cross-sectional view of a clutched, driven device or accessory constructed in accordance with the teachings of the present disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
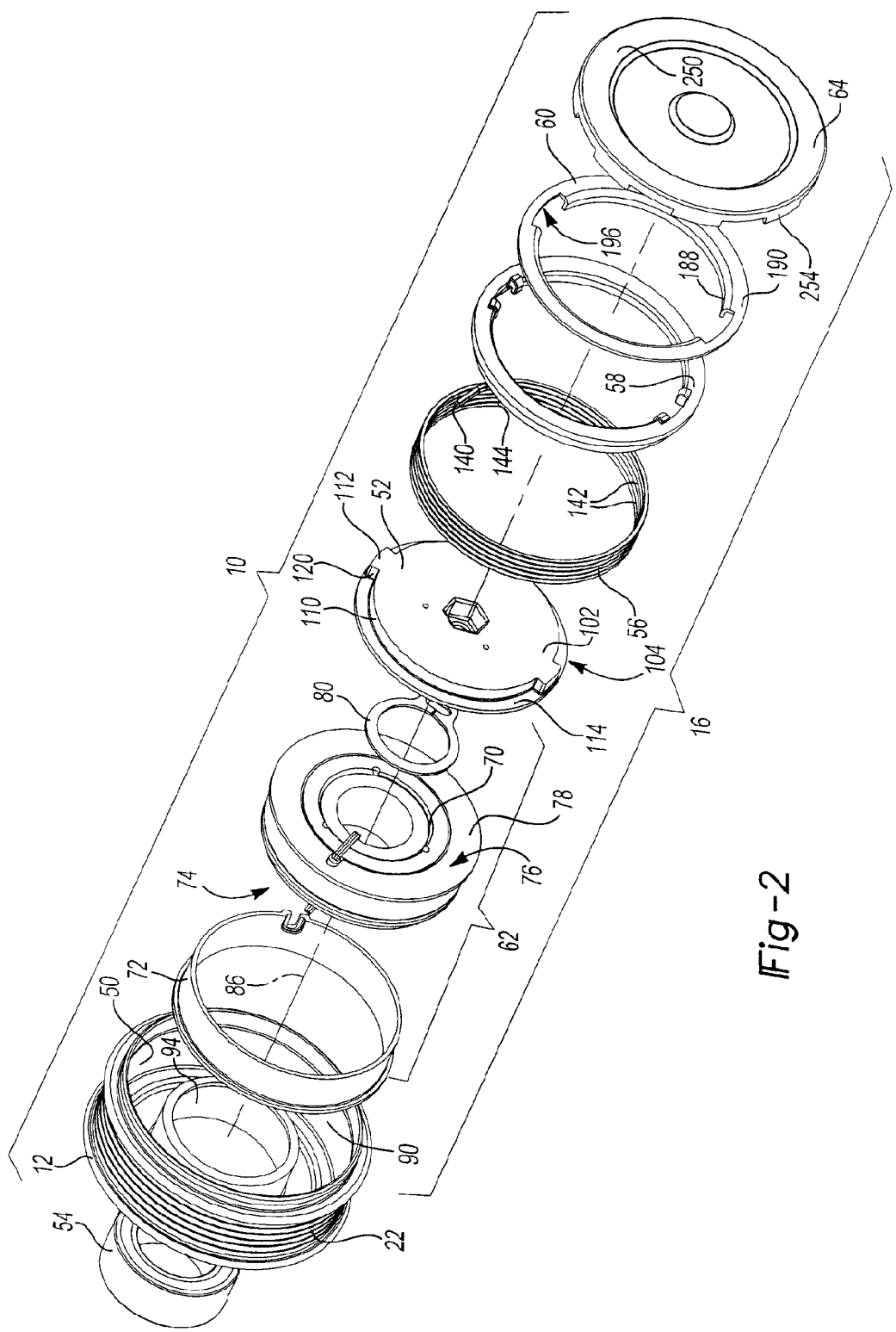
FIGS. 2 and 3 are front and rear exploded perspective views of a portion of the clutched, driven device of FIG. 1.
Figure 3:
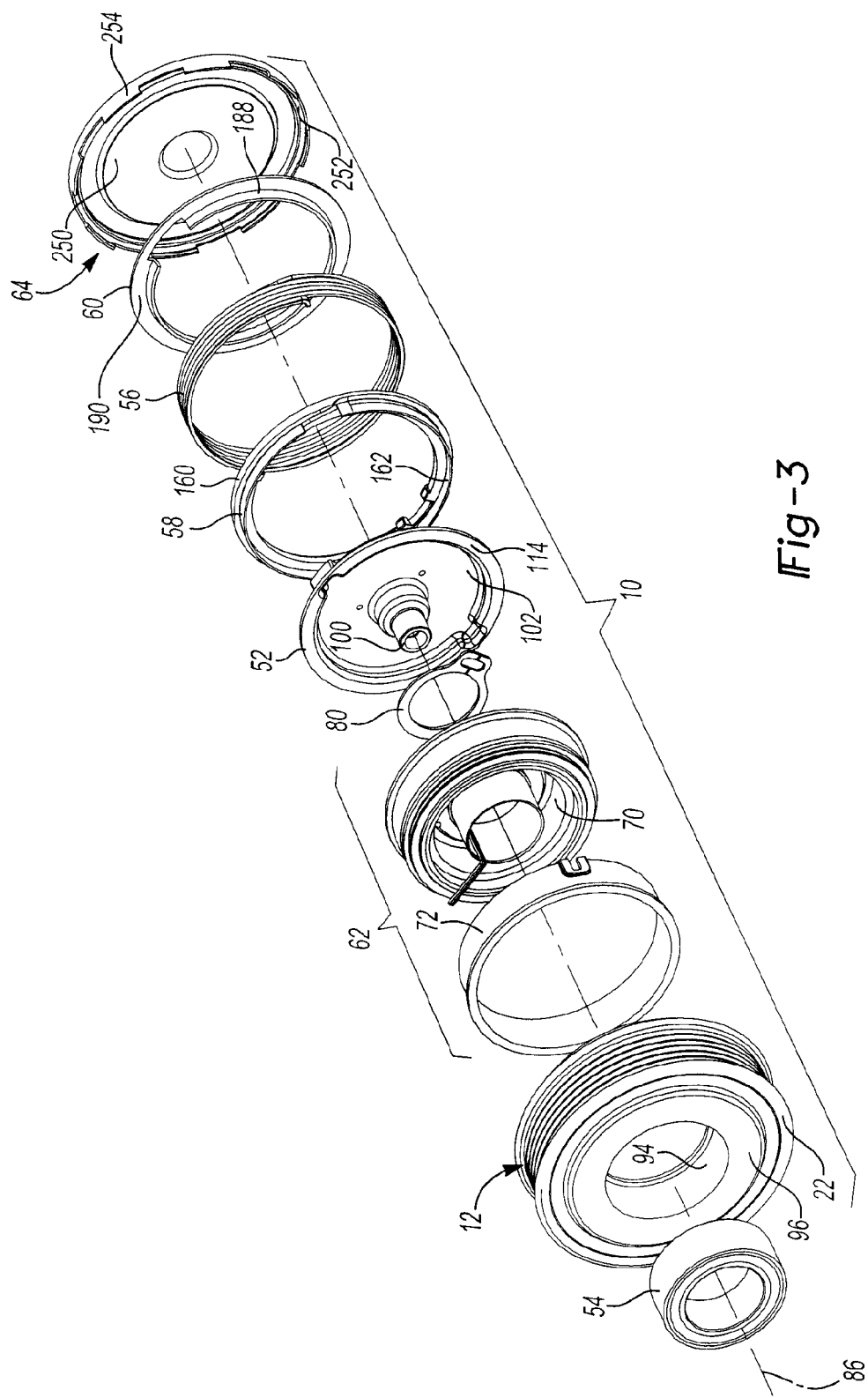

With reference to FIGS. 1 through 3 of the drawings, a clutched driven device or accessory constructed in accordance with the teachings of the present disclosure is generally indicated by reference numeral 10. The clutched driven device 10 can comprise an input member 12, a substantially conventional accessory portion 14 and a clutch assembly 16. In the particular example provided, the accessory portion 14 is an air conditioning compressor 20, but those of skill in the art will appreciate that the depiction of an air conditioning compressor is merely illustrative of one application of the present teachings and that the present teachings have application to various other types of engine accessories, such as fans, means for generating electricity (e.g., alternators, generators, starter-alternators, starter-generators), other types of pumps (e.g., water pumps, power steering pumps, hydraulic pumps, vacuum pumps, air compressors), blowers, super chargers, power-take offs and accessories that are driven by other power sources, including motors (e.g., electrically-powered or fluid-powered motors). Moreover, while the present teachings are depicted in an automotive or vehicle context, it will be appreciated that the teachings of the present disclosure have application to drive systems (i.e., systems for transferring motion, including systems that transfer rotary motion) generally.

The input member 12 can be configured to receive rotary power from an endless power transmitting member. Examples of various endless power transmitting members includes belts, chains, and gears. In the particular example provided, the input member 12 comprises a pulley sheave 22 that is configured to receive rotary power from a belt (not shown).

The air conditioning compressor 20 can be any type of air conditioning compressor, but in the particular example provided is a variable displacement air conditioning compressor. Variable displacement air conditioning compressors are known in the art and can employ various constructions, such as wobble plates, swash plates, movable scrolls, etc. The air conditioning compressor 20 can include a housing 30, an input member (e.g., input shaft 32), and a bearing set 34. The housing 30 can be configured to mount the clutched driven device 10 to a prime mover, such as an engine. The input shaft 32 can include an input end 40 and can be supported by the bearing set 34 for rotation relative to the housing 30. It will be appreciated that the input shaft 32 can be employed by the air conditioning compressor 20 as the means by which rotary power (for operating the air conditioning compressor) is received.

The clutch assembly 16 can comprise a first rotary clutch portion 50, a second rotary clutch portion 52, a bearing 54, a wrap spring 56, a carrier 58, a retainer 60, an actuator 62 and a cap assembly 64. The actuator 62 can have an actuator mount 70, an actuator input member 72, a first coil assembly 74, a second coil assembly 76, a brake shoe 78, and a retaining ring 80.

The first rotary clutch portion 50 can be configured to be coupled to the input member 12 for rotation therewith about a rotational axis 86. The first rotary clutch portion 50 can have a drive member 88 with an interior clutch surface 90. In the particular example provided, the first rotary clutch portion 50 comprises a tubular hub 94 and a radial flange 96 that is fixedly coupled to and extends radially outwardly from a rear end of tubular hub 94. The interior clutch surface 90 can be formed on an inside circumferential surface of the radial flange 96 so that it is concentrically disposed about the rotational axis 86. The radial flange 96 can be fixedly coupled to the input member 12 in any desired manner, such as welds, an interference fit (e.g., press-fit), staking and/or threaded fasteners, but in the particular example provided, the first rotary clutch portion 50 is integrally formed with the input member 12.

The second rotary clutch portion 52 can be configured to transmit rotary power to the input shaft 32 of the air conditioning compressor 20. In the particular example provided, the second rotary clutch portion 52 comprises a tubular hub portion 100, an intermediate portion 102, and a mounting portion 104. The hub portion 100 can be rotatably coupled to the input shaft 32 of the air conditioning compressor 20 in any desired manner, such as via a press-fit; teeth or splines; one or more threaded fasteners; and combinations of two or more thereof. In the particular example provided, the hub portion 100 has female threads that are threadably coupled to male threads formed on the input shaft 32. The intermediate portion 102 can extend between and rotatably couple the hub portion 100 to the mounting portion 104. The mounting portion 104 can comprise an annular mounting rim 110, one or more lugs 112 and a rear radial rim 114. The annular mounting rim 110 can extend in a circumferential direction and can be sized and shaped to receive the carrier 58 and the retainer 60 thereon as will be discussed in more detail below. The lug or lugs 112 can be fixedly coupled to one or both of the annular mounting rim 110 and the radial rim 114 and can have an abutment surface 120.

The bearing 54 can be received between the tubular hub 94 of the first rotary clutch portion 50 and the actuator mount 70. In this regard, the actuator mount 70 can have an annular coupling neck 130 and an annular coil mount 132 with an annular pocket 134 formed radially therebetween. The bearing 54 can be press-fit to the coupling neck 130 and can support the first rotary clutch portion 50 and the input member 12 for rotation relative to the actuator mount 70 about the rotational axis 86. The bearing 54 can be any type of bearing, such as a sealed double-row ball bearing. Lips 136 and 138 formed on the tubular hub 94 of the first rotary clutch portion 50 and the housing 30 of the air conditioning compressor 20 can axially confine the bearing 54 in a desired location.

Figure 5:
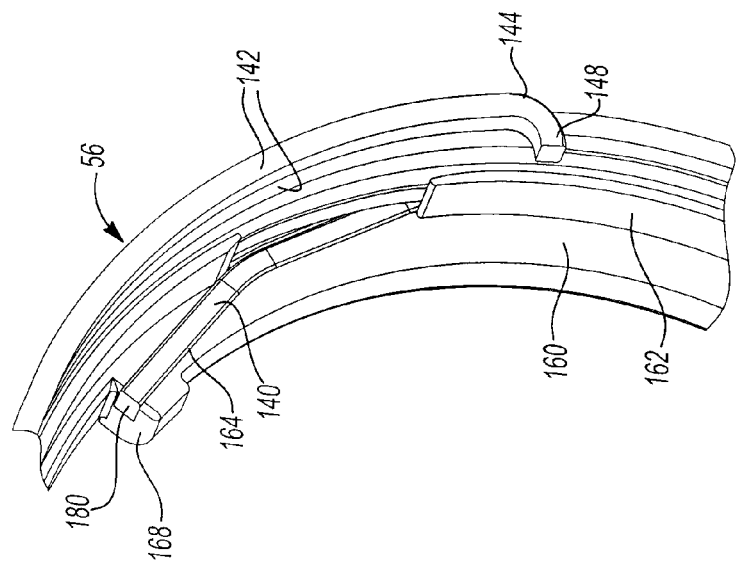
FIG. 5 is an enlarged portion of FIG. 4.
Figure 4:
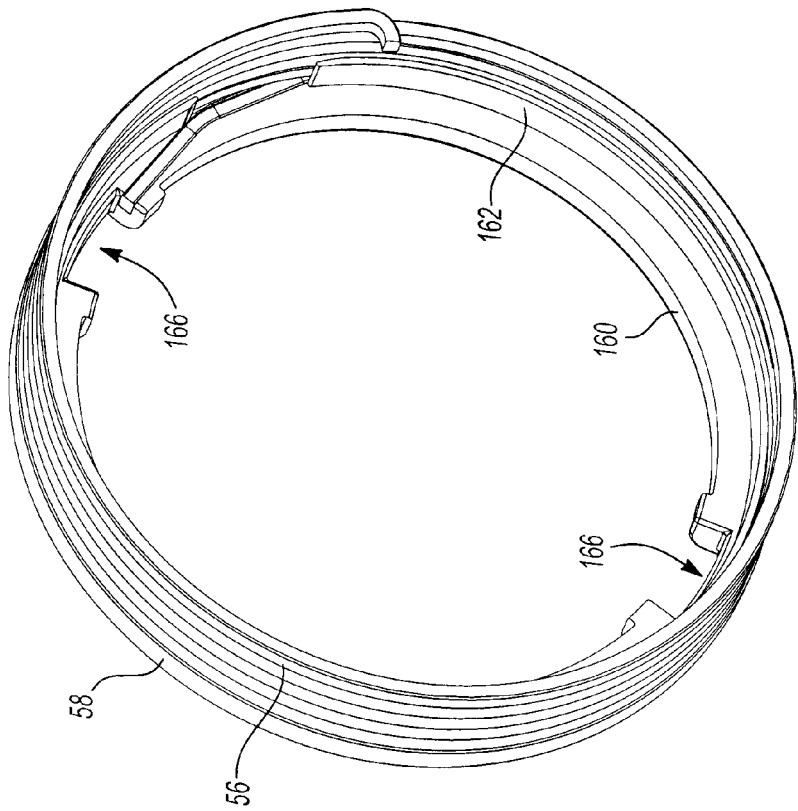
FIG. 4 is a rear perspective view of a portion of the clutched, driven device of FIG. 1 illustrating a wrap spring and a carrier in more detail.
Figure 6:
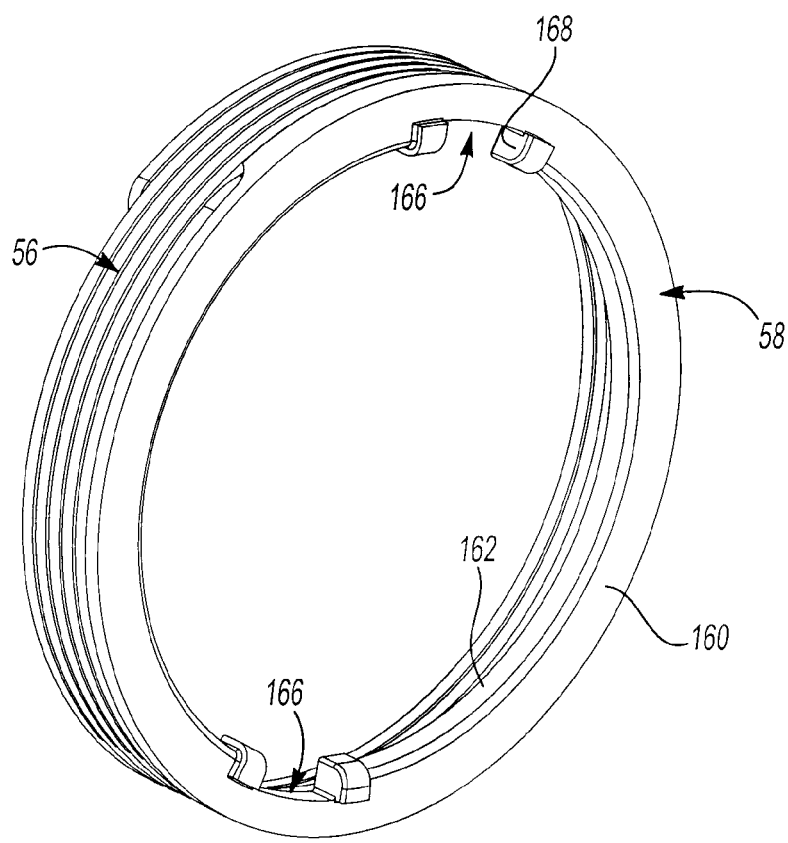
FIG. 6 is a front perspective view of a portion of the clutched, driven device of FIG. 1 illustrating the wrap spring and the carrier in more detail.

With reference to FIGS. 1, 2 and 5, the wrap spring 56 can be formed of an appropriate wire, which can have a generally square or rectangular cross-sectional shape. The wire that forms the wrap spring 56 can be uncoated (i.e., plain) or could be coated with a suitable material that can, for example, help to control friction, wear, and/or heat. Additionally or alternatively, the wire that forms the wrap spring 56 can be lubricated by a desired lubricant, such as an oil, a paste, a powder, a dry-film lubricant, a traction fluid or a grease. The wrap spring 56 can be disposed concentrically about the bearing 54 and can have a first end 140, a plurality of helical coils 142 and a second end 144 that is coupled to the helical coils 142 on an end that is opposite to the first end 140. In the particular example provided, the clutch assembly 16 is normally disengaged (so that rotary power is normally not transmitted from the first rotary clutch portion 50 to the second rotary clutch portion 52) and as such, the helical coils 142 can be disengaged or substantially disengaged (i.e., one or more of the helical coils 142 may touch the interior clutch surface 90, but not engage it to an extent that causes operation of the air conditioning compressor 20) from the interior clutch surface 90. The first end 140 can be configured to transmit rotary power from the helical coils 142 to the second rotary clutch portion 52 as will be discussed in more detail, below. The second end 144 can include a control tang 148 that can be coupled to the actuator 60 as will be discussed in more detail below.

With reference to FIGS. 1 and 3 through 6, the carrier 58 can be formed of a suitable material, such as steel or plastic, and can comprise a flange portion 160, a sleeve portion 162, a groove 164 and one or more lug recesses 166, each of which being configured to receive a corresponding one of the lugs 112 (FIG. 2) on the second rotary clutch portion 52 and having a carrier abutment wall 168. The flange portion 160 can be an annular structure having a first rear surface 172, a second rear surface 174 and a front surface 176. The first rear surface 172 can be disposed radially outwardly of the sleeve portion 162 and can abut the one of the helical coils 142 that is immediately, directly and continuously attached to the first end 140 of the wrap spring 56. In the example provided, portion of the first rear surface 172 that abuts the wrap spring 56 is helically shaped to match the contour of the helical coils 142 of the wrap spring 56. The second rear surface 174 can abut the radial rim 114 on the mounting portion 104 of the second rotary clutch portion 52. The sleeve portion 162 can be an annular structure that can extend axially from the flange portion 160. The sleeve portion 162 can be sized to be received in the helical coils 142 of the wrap spring 56 to support one or more of the helical coils 142 and/or to maintain the carrier 58 and the first end 140 of the wrap spring 56 in a predetermined orientation about the rotational axis 86. The groove 164 can be configured to receive the first end 140 of the wrap spring 56 and can extend through the circumference of the sleeve portion 162 and optionally through the carrier abutment wall 168. The carrier abutment wall 168 can abut the abutment surface 120 (FIG. 2) on one of the lugs 112 (FIG. 2) on the second rotary clutch portion 52 and if the groove 124 extends through the carrier abutment wall 168 (as is shown in the example provided), an axial end face 180 of the wire that forms the first end 140 of the wrap spring 56 can also abut the abutment surface 120 (FIG. 2) on the one of the lugs 112 (FIG. 2).

Returning to FIGS. 1 through 3, the retainer 60 can be coupled to the second rotary clutch portion 52 and can help to control axial endplay of the carrier 58 relative to the second rotary clutch portion 52 in a forward axial direction.

The retainer 60 can comprise a circumferentially-extending mounting rim 188 and a front radial rim 190 that can be coupled to and extend radially outwardly from a front portion of the circumferentially-extending mounting rim 188. The circumferentially-extending mounting rim 188 can be non-rotatably coupled to the annular mounting rim 110 in any desired manner, such as one or more welds, staking and/or an interference fit (e.g., press-fit). The flange portion 160 of the carrier 58 can be rotatably received on the circumferentially-extending mounting rim 188. The front radial rim 190 can abut the front surface 176 of the flange portion 160 of the carrier 58. In the particular example provided, lug clearance recesses 196 are formed in the retainer 60 to receive the portions of the flange portion 160 of the carrier 58 that define the lug recesses 166 such that the carrier 58 and the retainer 60 are coupled for common rotation.

The actuator 62 can be configured to selectively initiate uncoiling of the wrap spring 56 to cause the helical coils 142 to at least partly engage the interior clutch surface 90. More specifically, actuation of the actuator 62 can pull on the second end 144 of the wrap spring 56 to cause one or more of the helical coils 142 to uncoil or expand radially outwardly. Optionally, the actuator 62 can be used to selectively initiate coiling of the wrap spring 56 to cause the helical coils 142 to at least partly disengage the interior clutch surface 90 (e.g., by pulling on the second end 144 of the wrap spring 56 to cause one or more of the helical coils 142 to coil more tightly or contract radially inwardly).

Figure 7:
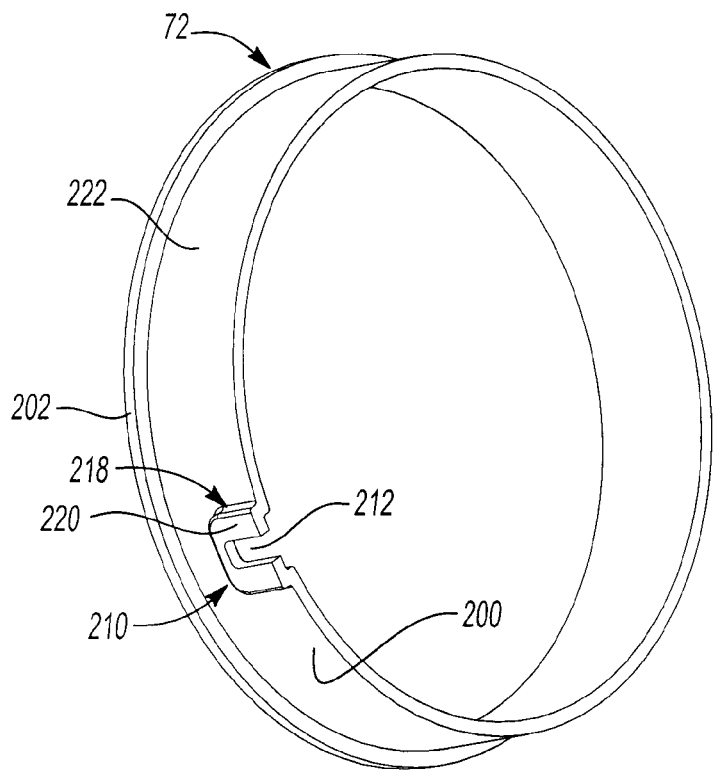
FIG. 7 is a front perspective view of a portion of the clutched, driven device of FIG. 1 illustrating an actuator input member in more detail.
Figure 8:
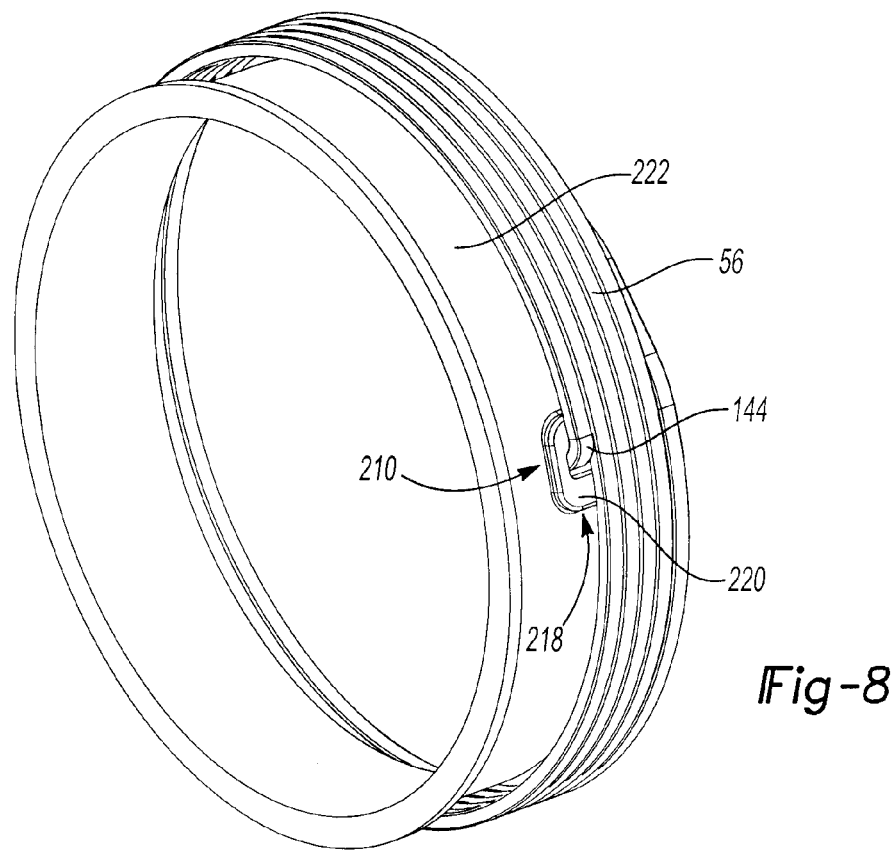
FIG. 8 is a rear perspective view illustrating the wrap spring and the actuator input member.
Figure 9:
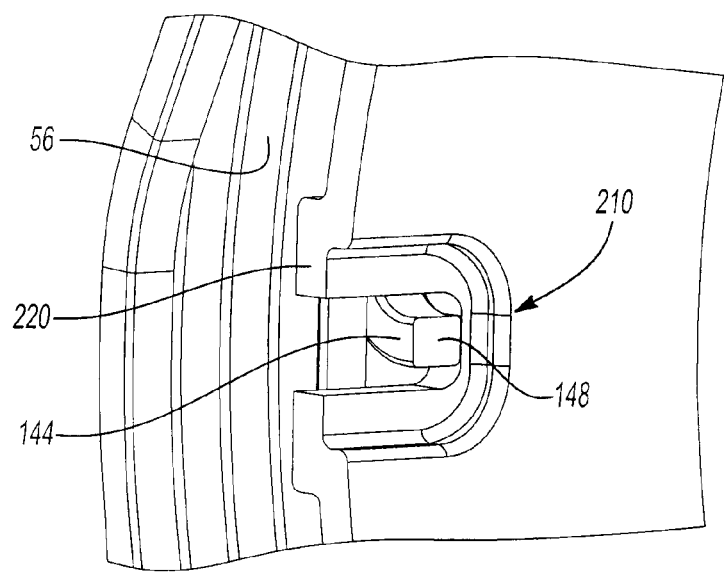
FIG. 9 is a front perspective view illustrating a portion of the wrap spring and the actuator input member where a second end of the wrap spring couples to the actuator input member.

With reference to FIGS. 1, 2 and 7, the actuator input member 72 can comprise an annular body 200 and an end flange 202 that can be coupled to a rear end of the annular body 200 and extend radially outwardly therefrom. The actuator input member 72 can be wholly or partly formed of a magnetically susceptible material, such as steel or iron, and may be formed in whole or in part from a powdered metal material. The annular body 200 can have an engagement 210 that is configured to engage the second end 144 of the wrap spring 56. The control tang 148 can be coupled to the annular body 200 in any desired manner that permits axial movement of the annular body 200 relative to the control tang 148 along the rotational axis 86 but which limits relative rotation therebetween. With additional reference to FIGS. 8 and 9, the engagement 210 can comprise a slotted aperture 212 that is configured to receive the control tang 148 on the second end 144 of the wrap spring 56. In the particular example provided, the slotted aperture 212 is disposed in a zone 218 on the annular body 200 that is formed radially outwardly of a remaining portion of the annular body 200 to create a protrusion 220 on an exterior surface 222 of the annular body 200. The protrusion 220 can support the helical coil 142 that is immediately coupled to the second end 144 of the wrap spring 56. The actuator input member 72 can be positioned such that the annular body 200 is received concentric with and radially inwardly of the helical coils 142 and the end flange 202 is proximate the first rotary clutch portion 50.

Returning to FIG. 1, the first and second coil assemblies 74 and 76 are configured to move the actuator input member 72 in opposite axial directions along the rotational axis 86. In the particular example provided, the first and second coil assemblies 74 and 76 are fixedly coupled to the actuator mount 70 and disposed concentrically with the annular body 200. It will be appreciated that the actuator mount 70 could be formed in whole or in part (such as a part that is proximate the first and second coil assemblies 74 and 76) of a material that is not magnetically susceptible, such as aluminum, stainless steel or plastic. The first and second coil assemblies 74 and 76 can be individually activated to move the actuator input member 72 in a desired axial direction. For example, activation or powering of the first coil assembly 74 can cause movement of the actuator input member 72 in a rearward direction (into a first position) such that a rear surface 230 of the end flange 202 contacts the first rotary clutch portion 50 (the second coil assembly 76 can be deactivated or unpowered at such time), while activation or powering of the second coil assembly 76 can cause movement of the actuator input member 72 in a forward direction (into a second position) such that a front surface 232 of the annular body 200 contacts the brake shoe 78 (the first coil assembly 74 can be deactivated or unpowered at such time). It will be appreciated that terminals for the first and second coil assemblies 74 and 76 can be received through the actuator mount 70 and can ultimately be coupled to a controller (not shown) that selectively couples the first and second coil assemblies 74 and 76 to a source of electrical power. It will also be appreciated that the actuator input member 72 could be positioned (in a third or intermediate position) between the first and second positions so that it does not contact the first rotary clutch portion 50 or the brake shoe 78.

The brake shoe 78 can be coupled to any structure that is stationary relative to the input member 12. In the particular example provided, the brake shoe 78 is fixedly mounted on the actuator mount 70 between the actuator mount 70 and the second coil assembly 76 and includes a shoe member 240 that is disposed axially in-line with the actuator input member 72. The brake shoe 78 can be formed of a magnetically susceptible material, such as steel, and can form a part of the magnetic circuit that is employed to axially move the actuator input member 72.

With reference to FIGS. 1 through 3, the retaining ring 80 can be employed to axially retain the actuator mount 70 to the housing 30 of the air conditioning compressor 20.

The cap assembly 64 can comprise a cap member 250 and a seal member 252 that can be configured to create a seal between the cap member 250 and the input member 12. The cap member 250 can be configured to be engaged to the input member 12 to close a front end of a cavity into which the clutch assembly 16 is received. In the particular example provided, the cap member 250 includes resilient fingers 254 that snap-fit to the input member 12 in a fastener-less manner. It will be appreciated, however, that other coupling means may be employed and that some coupling means may obviate the need for the seal member 252.

In operation, rotary power can be provided to the input member 12 to cause the input member 12 to rotate about the rotational axis 86, causing corresponding rotation of the first rotary clutch portion 50. With the clutch assembly 16 in a disengaged condition, the actuator input member 72 is positioned such that the end flange 202 is spaced apart from the first rotary clutch portion 50 and the helical coils 142 of the wrap spring 56 are disengaged from the interior clutch surface 90.

The first coil assembly 74 can be energized to initiate the transmission of rotary power through the clutch assembly 16. As described above, energization or activation of the first coil assembly 74 can cause the actuator input member 72 to move axially rearward along the rotational axis 86 such that the rear surface 230 of the end flange 202 contacts the first rotary clutch portion 50. Contact between the first rotary clutch portion 50 and the end flange 202 can cause the actuator input member 72 to tend to rotate with the first rotary clutch portion 50. It will be appreciated that rotation of the first end 140 of the wrap spring 56 will be resisted to one degree or another due to the driving connection between the first end 140 of the wrap spring 56 to the input shaft 32 of the air conditioning compressor 20. This resistance (to the rotation of the first end 140 of the wrap spring 56) can cause the helical coils 142 to expand radially outwardly and contact the interior clutch surface 90. When sufficient contact between the helical coils 142 and the interior clutch surface 90 occurs, rotational energy can be transmitted from the wrap spring 56 to the second rotary clutch portion 52 to the input shaft 32 to drive the air conditioning compressor 20.

In the particular example provided, the wrap spring 56 has a configuration that maintains energization or engagement with the interior clutch surface 90 when rotary power is being transmitted through the clutch assembly 16. Stated another way, once rotary power is transmitted through the clutch assembly 16, the wrap spring 56 will tend to stay engaged to the interior clutch surface 90 to continue transmitting rotary power through the clutch assembly 16. Accordingly, the first coil assembly 74 need not be powered and can be deactivated without halting the transmission of rotary power through the clutch assembly 16. It will be appreciated that various control techniques could be employed to control the deactivation of the first coil assembly 74, including various timers and/or sensors. A control technique that employs a timer may simply deactivate the first coil assembly 74 after a predetermined time interval. Alternatively, a sensor could be employed to confirm operation of the air conditioning compressor 20, such as a speed sensor coupled to the input shaft 32 or a sensor that is configured to sense a performance characteristic, such as the temperature or pressure of the fluid exiting the air conditioning compressor 20.

To halt operation of the air conditioning compressor 20, the first coil assembly 74 can be deactivated and the second coil assembly 76 can be powered or activated to cause the actuator input member 72 to translate axially forwardly along the rotational axis 86 so that front surface 176 of the annular body 200 frictionally engages the shoe member 240 to thereby rotationally decelerate the actuator input member 72. It will be appreciated that because the second end 144 of the wrap spring 56 is coupled to the actuator input member 72 for rotation therewith, the rotational deceleration of the actuator input member 72 will cause corresponding rotational deceleration of the second end 144 of the wrap spring 56, which in turn causes the helical coils 142 to coil or contract radially inwardly and disengage the interior clutch surface 90 to thereby halt driving engagement between the interior clutch surface 90 and the helical coils 142 so that the transmission of rotary power through the clutch assembly 16 is interrupted. Once the transmission of rotary power through the clutch assembly 16 has been interrupted, electrical power to the second coil assembly 76 may be terminated. It will be appreciated that various control techniques could be employed to control the deactivation of the second coil assembly 76, including various timers and/or sensors. A control technique that employs a timer may simply deactivate the second coil assembly 76 after a predetermined time interval. Alternatively, a sensor could be employed to confirm non-operation of the air conditioning compressor 20, such as a speed sensor coupled to the input shaft 32 or a sensor that is configured to sense a performance characteristic, such as the temperature or pressure of the fluid exiting the air conditioning compressor 20.

It will be appreciated that because the clutch assembly 16 can be operated with relatively little electric power and can be cycled (i.e., engaged and disengaged or disengaged and engaged) relatively quickly, the accessory portion 14 could be operated in a pulse-width modulated manner in which a duty cycle associated with the operation of the accessory portion 14 can be tailored in a desired manner depending on a desired pulsed output of the accessory portion 14, an amount of energy that is available to drive the input member 12 and an amount of energy that is available to operate the actuator 62. Such considerations may be particularly important when the clutched, driven device 10 is integrated into a vehicle accessory drive and the vehicle has a belt-alternator-starter (BAS) system with an idle stop accessory function. In a vehicle that is equipped in this manner, the alternator-starter may be employed to provide rotary power to the belt of an accessory drive to drive the input member 12 when the vehicle is stopped and the primary source of propulsive power, usually an internal combustion engine, is deactivated. In situations where the accessory portion 14 is clutched using a conventional clutch (e.g., a magnetically actuated friction plate clutch), the continuous operation of the accessory portion 14 (e.g., an air conditioning compressor) could quickly drain the vehicle batteries (and thereby impede the ability to re-start the internal combustion engine). Moreover, rapid engagement/disengagement of such conventional clutches is not desirable as it may have a deleterious effect on the life of the friction plates. Accordingly, a clutch assembly constructed in accordance with the teachings of the present disclosure provides opportunities to control the accessory portion 14 in ways that may not be suitable when other clutch types are employed. For example, where the accessory portion includes a variable displacement air conditioning compressor, it may be desirable to operate the clutch assembly in pulsed (non-continuous) manner and to simultaneously operate the air conditioning compressor such that it has a relatively low displacement. Operation in this manner can reduce the torque load that would be required to operate the air conditioning compressor to thereby reduce power consumption and maximize the duration of the operation of the accessory portion for a given state of battery charge in an electric or hybrid vehicle or in a vehicle equipped with a BAS having ISAF when the internal combustion engine is not operating.

While the end flange 202 has been characterized as being spaced apart from the first rotary clutch portion 50 when the clutch assembly 16 is in a disengaged condition, it will be appreciated that in the alternative, the end flange 202 may contact the first rotary clutch portion 50 to a small degree that does not cause the helical coils 142 to expand radially outwardly and contact the interior clutch surface 90.

Figure 10:
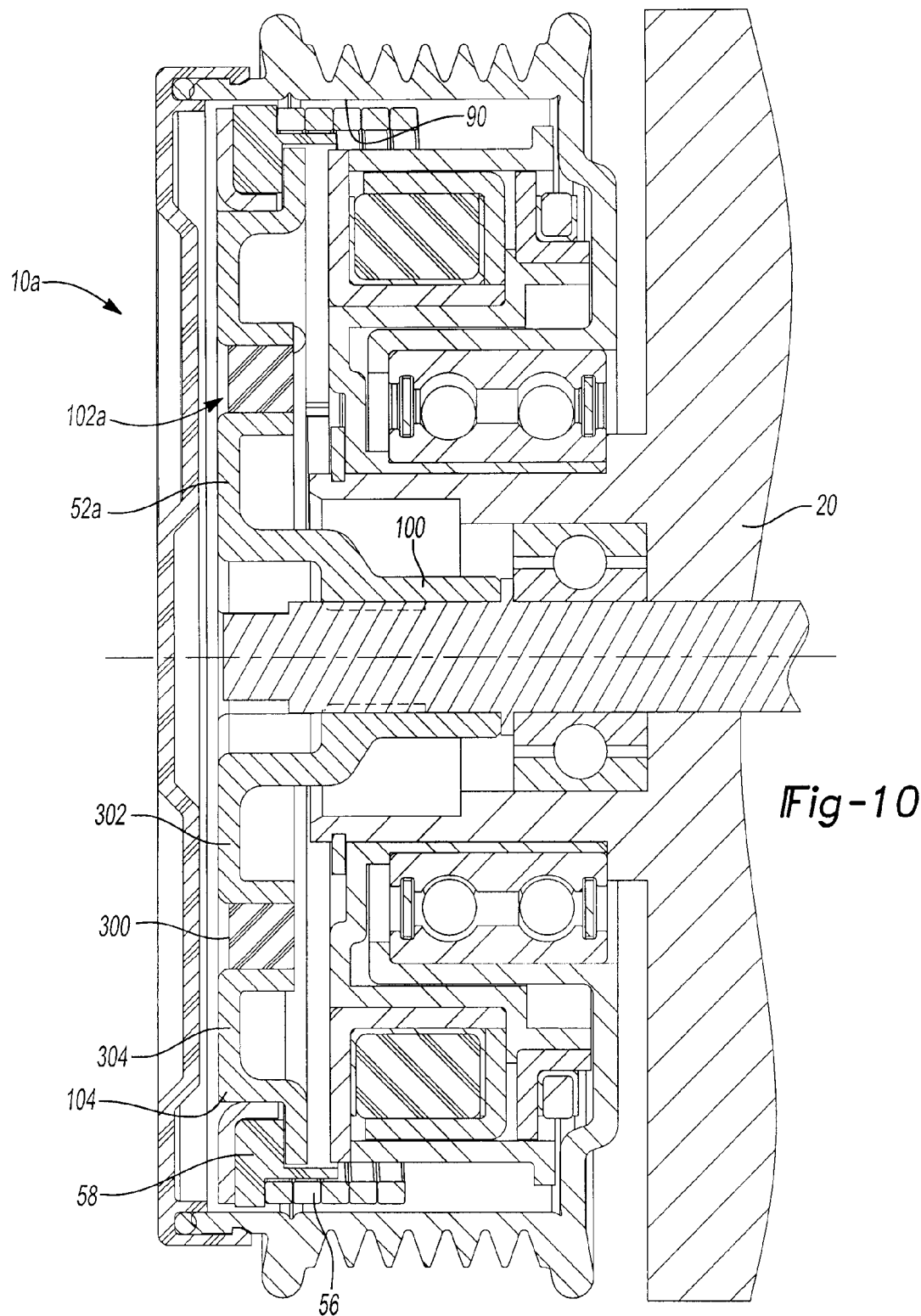
FIG. 10 is a longitudinal cross-sectional view of a second clutched, driven device or accessory constructed in accordance with the teachings of the present disclosure.

With reference to FIG. 10, a second clutched, driven device constructed in accordance with the teachings of the present disclosure is generally indicated by reference numeral 10a. The device 10a can be generally identical to the device 10 of FIG. 1, except that the intermediate portion 102a of the second rotary clutch portion 52a comprises a resilient member 300 that is disposed between a first portion 302, which is coupled to the hub portion 100, and a second portion 304 that is coupled to the mounting portion 104. The resilient member 300 can be an annular structure and can be configured to attenuate vibration at one or more predetermined frequencies. The vibration may be generated during operation of the air conditioning compressor 20 and as such, the resilient member 300 can be configured to isolate the carrier 58, the wrap spring 56 and the interior clutch surface 90 from the air conditioning compressor 20.

Figure 11:
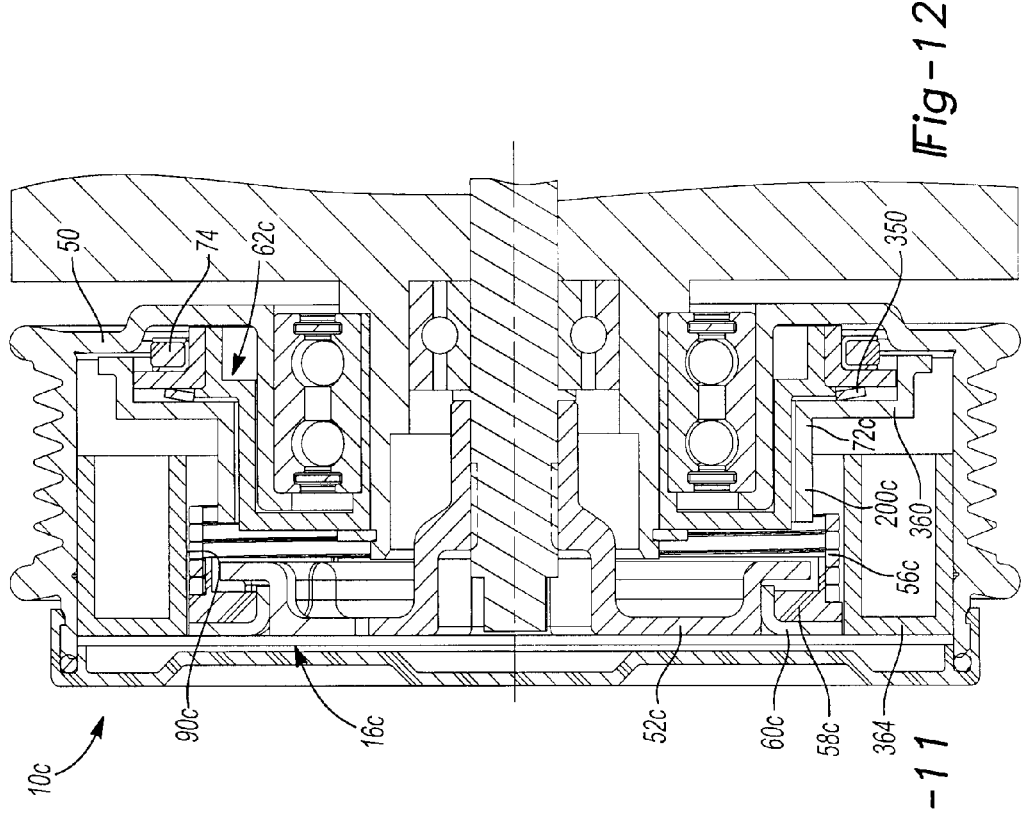
FIG. 11 is a longitudinal cross-sectional view of a third clutched, driven device or accessory constructed in accordance with the teachings of the present disclosure.

With reference to FIG. 11, a third clutched, driven device constructed in accordance with the teachings of the present disclosure is generally indicated by reference numeral 10*b*. The device 10*b* can be generally identical to the device 10*a* of FIG. 10, except that the first and second coil assemblies 74*b* and 76*b* are illustrated as being sized differently. It is within the level of one of ordinary skill in the art to size the first and second coil assemblies 74 and 76 in a manner that would provide the performance that is discussed above.

Figure 12:
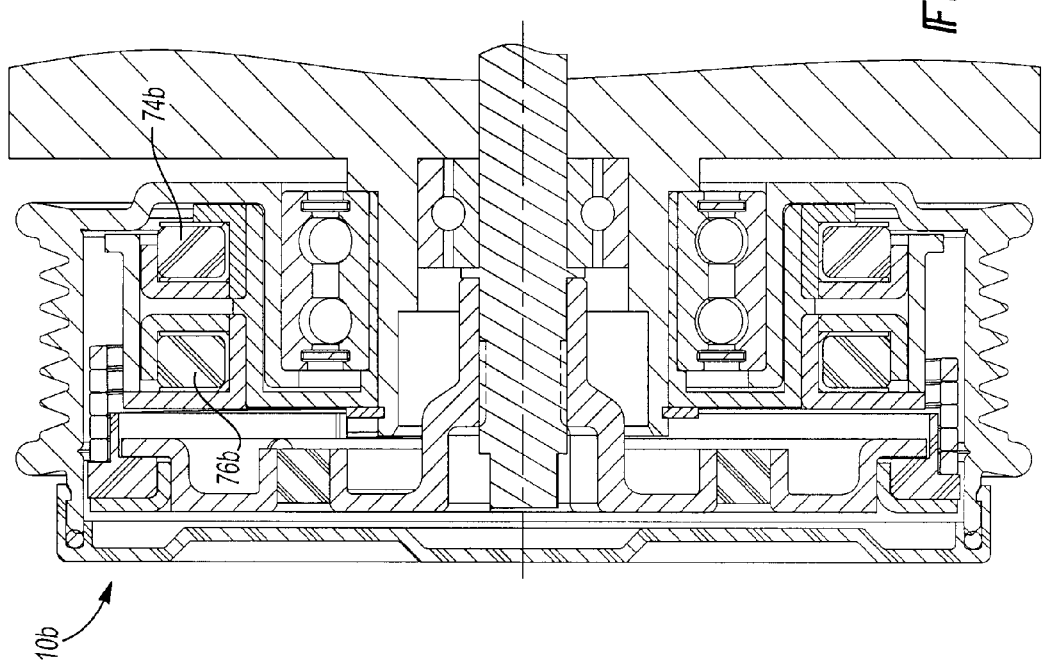
FIG. 12 is a longitudinal cross-sectional view of a fourth clutched, driven device or accessory constructed in accordance with the teachings of the present disclosure.

With reference to FIG. 12, a fourth clutched, driven device constructed in accordance with the teachings of the present disclosure is generally indicated by reference numeral 10*c*. The device 10*c* can be generally identical to the device 10 of FIG. 1, except that the actuator 62*c* comprises a single coil assembly (i.e., the first coil assembly 74) and a return spring 350, such as a Bellville spring washer, a leaf spring or a wave spring, is disposed between the actuator input member 72*c* and the first coil assembly 74 that biases the actuator input member 72*c* in a forward direction so that it would be disengaged from the first rotary clutch portion 50 when the first coil assembly 74 is unpowered or deactivated.

Figure 14:
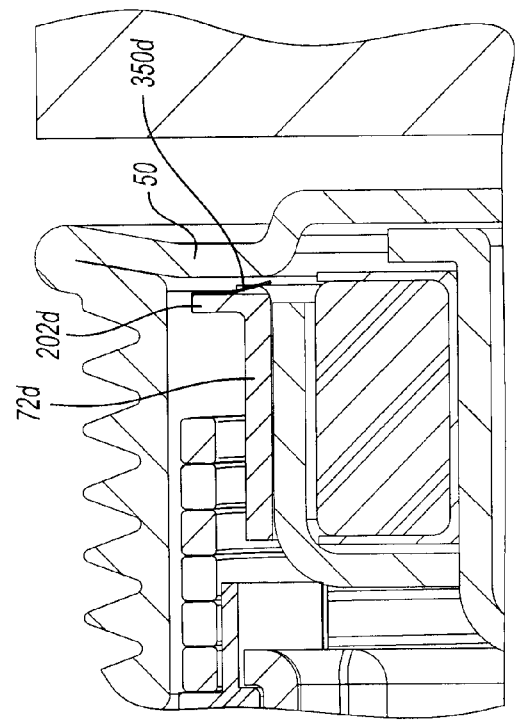
FIG. 14 is an enlarged portion of FIG. 13.
Figure 13:
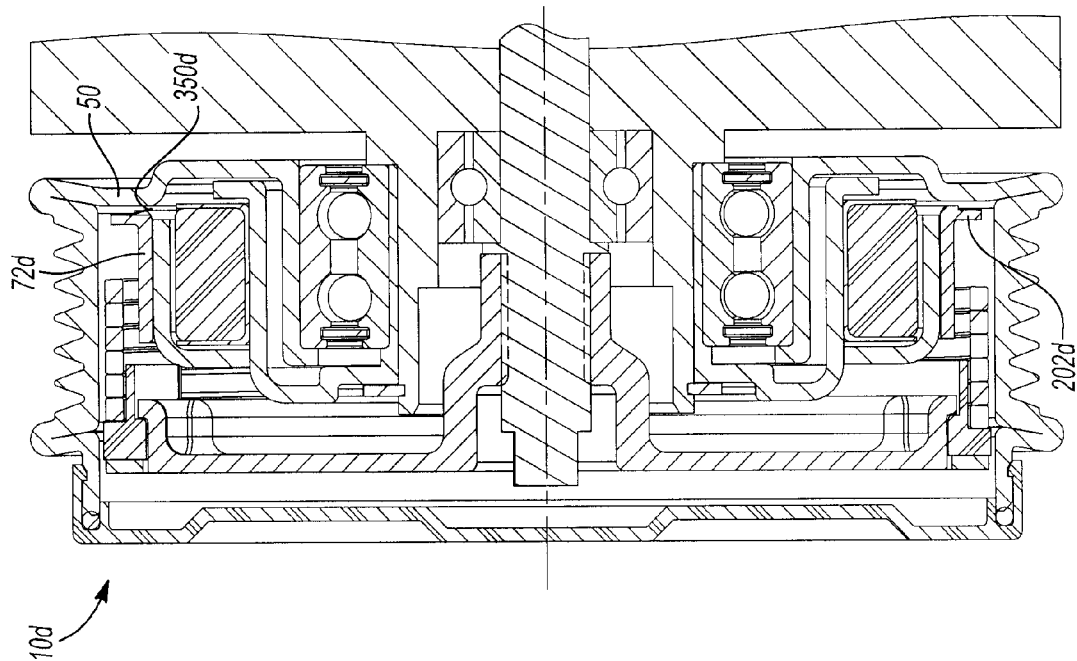
FIG. 13 is a longitudinal cross-sectional view of a fifth clutched, driven device or accessory constructed in accordance with the teachings of the present disclosure.
Figure 15:
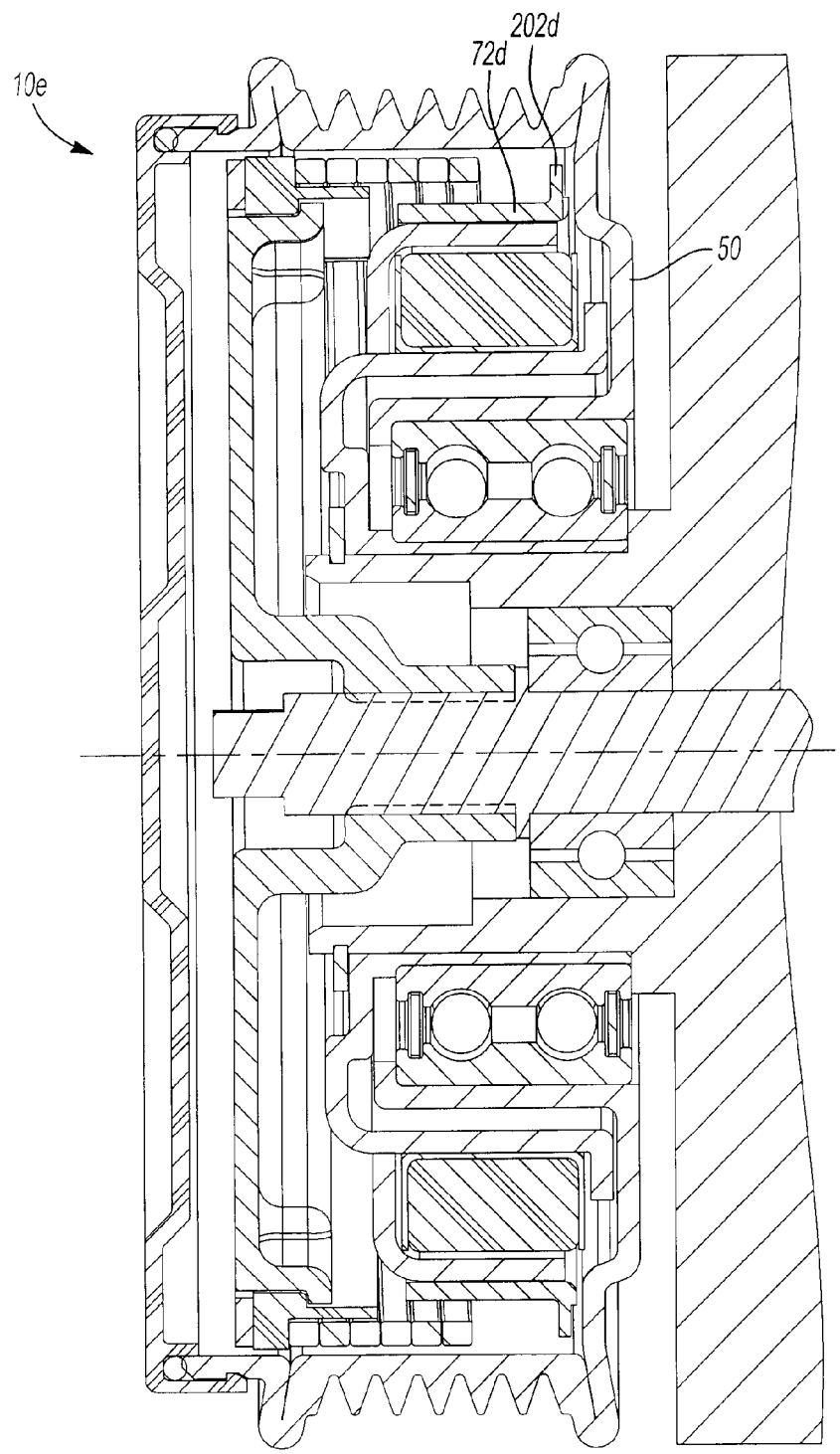
FIG. 15 is a longitudinal cross-sectional view of a sixth clutched, driven device or accessory constructed in accordance with the teachings of the present disclosure.

In the particular example provided, a shoulder 360 is formed into the actuator input member 72*c* and serves as a reaction surface against which the return spring 350 is engaged. To accommodate the jog in the annular body 200*c* that forms the shoulder 360 of the actuator input member 72*c*, the wrap spring 56*c*, carrier 58*c*, retainer 60*c*, and second rotary clutch portion 52*c* are shown to be somewhat smaller in diameter and an annular spacer 364 has been fitted to the first rotary clutch portion 50*c* to shift the location of the interior clutch surface 90*c* radially inwardly. The reduction in the overall diameter of the wrap spring 56*c* (as compared to the wrap spring 56 of FIG. 1) may help to prevent the wrap spring 56*c* from self-locking due to centrifugal forces so that the clutch assembly 16*c* can disengage when the first coil assembly 74 is de-energized. It will be appreciated that the return spring 350 could be integrated into the clutch assembly 16*c* in various different ways that are not particularly germane to the function of the clutch assembly 16*c* and as such, the particular embodiment illustrated will be understood as not limiting the broader concept. In this regard, a fifth clutched, driven device 10*d* shown in FIGS. 13 and 14 has a differently configured actuator input member 72*d* that is more similar to that which is shown in FIG. 1. In this example, however, the return spring 350*d* is directly mounted to the end flange 202*d* and is configured to directly contact the first rotary clutch portion 50. Of course those of skill in the art will appreciate from this disclosure that a single coil assembly may be used without a return spring. In the example of FIG. 15, the clutched, driven device 10*e* is identical to the clutched, driven device 10*d* except the return spring 350*d* (FIG. 13) has been omitted.

Figure 16:
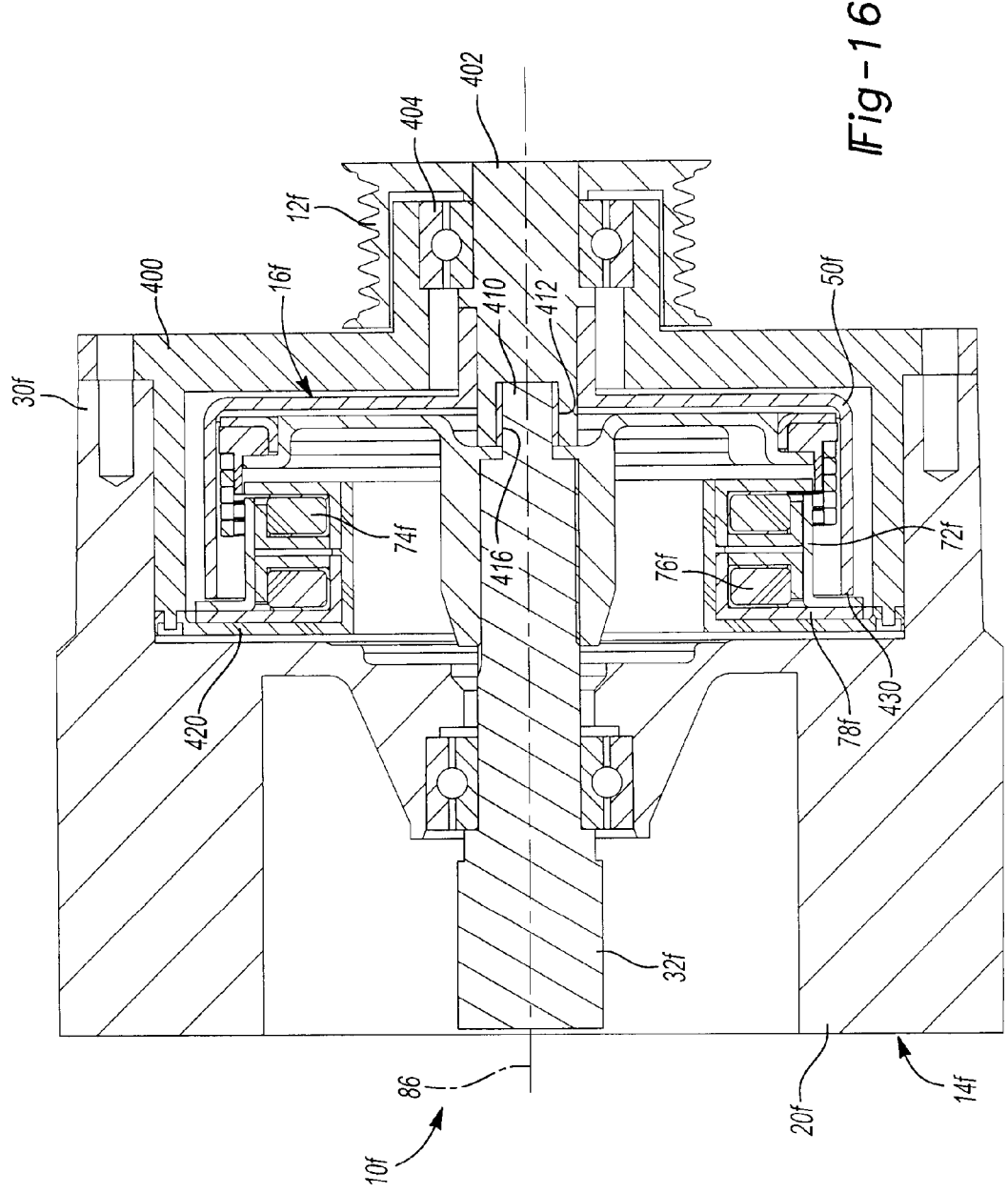
FIG. 16 is a longitudinal cross-sectional view of a seventh clutched, driven device or accessory constructed in accordance with the teachings of the present disclosure.

With reference to FIG. 16, a seventh clutched, driven device constructed in accordance with the teachings of the present disclosure is generally indicated by reference numeral 10*f*. In the particular example provided, the accessory portion 14*f* is a supercharger 20*f* having an input shaft 32*f*, and the clutch assembly 16*f* includes a clutch housing 400, a stub shaft 402, and a stub shaft bearing 404. The clutch housing 400 can be configured to mount the clutch assembly 16*f* to the housing 30*f* of the supercharger 20*f*. The input member 12*f* can be coupled to the stub shaft 402 for common rotation about the rotational axis 86. The stub shaft bearing 404 can support the stub shaft 402 for rotation relative to the clutch housing 400. Optionally, one of the stub shaft 402 and the input shaft 32*f* can be supported on the other one of the stub shaft 402 and the input shaft 32*f*. In the example provided, the input shaft 32*f* includes a necked-down portion 410 that is received into a recessed portion 412 formed in the stub shaft 402. A bushing 416 can be disposed between the necked-down portion 410 and the recessed portion 412.

The first rotary clutch portion 50*f* can be coupled to the stub shaft 402 for rotation therewith. The first and second coil assemblies 74*f* and 76*f* and the brake shoe 78*f* can be coupled to the clutch housing 400. In the example provided, the first and second coil assemblies 74*f* and 76*f* and the brake shoe 78*f* are mounted to an annular bracket 420, which is fixedly coupled to the clutch housing 400.

The first and second coil assemblies 74*f* and 76*f* can be controlled to translate the actuator input member 72*f* into contact with an axial end face 430 of the first rotary clutch portion 50*f* or the brake shoe 78*f* to engage or disengage the clutch assembly 16*f*.

Figure 17:
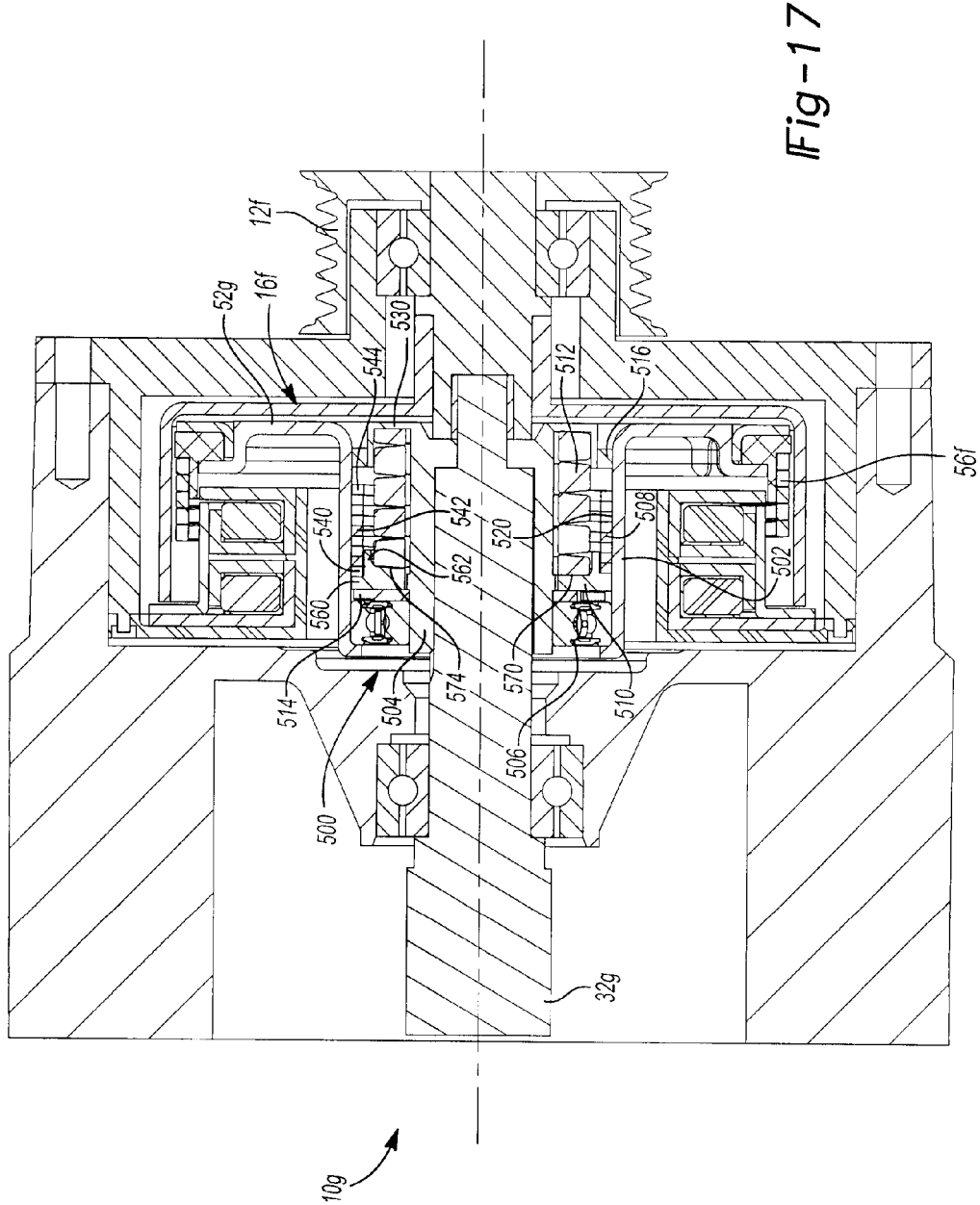
FIG. 17 is a longitudinal cross-sectional view of an eighth clutched, driven device or accessory constructed in accordance with the teachings of the present disclosure.

With reference to FIG. 17, an eighth clutched, driven device constructed in accordance with the teachings of the present disclosure is generally indicated by reference numeral 10*g*. The device 10*g* is generally similar to the device 10*f* of FIG. 16, except that a decoupler assembly 500 is disposed in the torque path between the second rotary clutch portion 52*g* and the input shaft 32*g*.

The decoupler assembly 500 can include an input member 502, an output member 504, a bearing 506, a clutch spring 508, a clutch carrier 510, a torsion coupling 512, a thrust washer 514 and a support bushing 516.

The input member 502 can be fixedly coupled to the second rotary clutch portion 52*g* such that the two elements co-rotate. The input member 502 and the second rotary clutch portion 52*g* are depicted as being unitarily formed, but it will be appreciated that the two elements may be separately formed and assembled together. The input member 502 can define a generally cylindrical interior clutch surface 520.

The output member 504 can be fixedly coupled to the input member 502*g* of the supercharger 20*g* such that the two elements co-rotate. The output member 504 can define a reaction member (not shown) that is configured to abut the torsion coupling 512 to permit rotary power to be transmitted from the torsion coupling 512 to the output member 504. In the example provided, the torsion coupling 512 is a helical torsion spring having open ends that are not ground, and the reaction member (not shown) is an abutment that is disposed in a helical recess 530 formed in the output member 504. The abutment is configured to directly abut an end face of the wire that forms the helical torsion spring.

The bearing 506 can be disposed between the input member 502 and the output member 504 on a side of the output member 504 opposite the side with the abutment on the output member 504. The bearing 506 can support the input member 502 and the second rotary clutch portion 52*g* for rotation relative to the output member 504. Similarly, the support bushing 516 can be disposed between the output member 504 and the input member 502 on a side of the output member 504 opposite the bearing 506. The support bushing 516 can also support the input member 502 and the second rotary clutch portion 52*g* for rotation relative to the output member 504

The clutch spring 508 can comprise a first end 540, a plurality of helical coils 542 and a second end 544 that is disposed on an end of the helical coils 542 opposite the first end 540. The helical coils 542 can be engaged to the interior clutch surface 520 and in the particular example provided, are press-fit to the interior clutch surface 520. The first end 540 can be configured to transmit rotary power from the helical coils 542 to the clutch carrier 510 and/or the torsion coupling 512 as will be discussed in more detail, below.

The clutch carrier 510 can be formed of a suitable material, such as steel or plastic, and can comprise a flange portion 560, a sleeve portion 562, a groove (similar to the groove 164 in FIG. 5) and an abutting lug (not specifically shown) that is configured to drivingly engage the torsion coupling 512. The flange portion 560 can be an annular structure having a front surface 570 that is helically shaped to match the contour of the helical coils 542 of the clutch spring 508. The sleeve portion 562 can be sized to be received in the helical coils 542 of the clutch spring 508 to support one or more of the helical coils 542 and/or to maintain the clutch carrier 510 and the first end 540 of the clutch spring 508 in a predetermined orientation about the rotational axis 86g. The groove can be configured to receive the first end 540 of the clutch spring 508 and can extend through the circumference of the sleeve portion 562 and optionally through the abutting lug. In the example provided, the abutting lug is disposed in a helical groove 574 and is configured to engage the open, unground end of the torsion spring on an end of the torsion spring opposite the output member 504.

The thrust washer 514 can be fixedly coupled to the output member 504 and can be positioned such that the torsion spring can be axially compressed between the clutch carrier 510 and the output member 504.

The decoupler assembly 500 can be configured to transmit rotary power from the second rotary clutch portion 52g to the input shaft 32g but to inhibit the transmission of rotary power from the input shaft 32g to the second rotary clutch portion 52g as would happen when the input member 502g is decelerating and the inertia of the supercharger 20f would tend to back-drive the input member 12f.

It will be appreciated that the wrap spring 56f and the clutch spring 508 are disposed in series (i.e., torque transmitted through the wrap spring 56f is subsequently transmitted through the clutch spring 508). It will also be appreciated that the decoupling assembly 500 is concentric with the clutch assembly 16f (e.g., the wrap spring 56f is disposed concentrically about the clutch spring 508) and that the wrap spring 56f and the clutch spring 508 axially overlap one another along the rotational axis of the input member 12f. Those of skill in the art will appreciate from this disclosure that when rotary power is transmitted through the clutch assembly 16f, the decoupler assembly 500 can permit the input shaft 32g to overrun the second rotary clutch portion 52g. In this regard, acceleration of the input shaft 32g relative to the second rotary clutch portion 52g can cause motion of the input shaft 32g relative to the second rotary clutch portion 52g such that the helical coils 542 of the clutch spring 508 contract out of engagement with the interior clutch surface 520 and permit the output member 504 to rotate in the predetermined rotational direction relative to the second rotary clutch portion 52g. Configuration in this manner provides isolation without significantly affecting the axial length of the clutched, driven device (as compared to a similar clutched, driven device that does not have a decoupler assembly). In the particular example provided, the clutched, driven device of FIG. 17 has the same axial length as the clutched, driven device of FIG. 16. Accordingly, a clutched, driven device having a decoupler assembly and constructed in accordance with the teachings of the present disclosure can be packaged into relatively tight places, including those where traditional electromagnetic plate clutches are employed. Moreover, it is my experience that it is not possible to add isolation to a traditional electromagnetic plate clutch without increasing the packaging size of the clutched, driven device in some way (e.g., the size of the clutch assembly, the input member or accessory portion).

Returning to FIG. 1, when the air conditioning compressor 20 has a variable displacement, the displacement of the air conditioning compressor 20 could be set to predetermined values immediately prior to engagement or disengagement of the clutch assembly 16 to reduce noise, vibration or impact loading on the clutch. For example, the displacement of the air conditioning compressor 20 could be set to a predetermined low displacement (e.g., a minimum displacement or a displacement of zero) before the clutch assembly 16 is engaged. Thereafter, the displacement of the air conditioning compressor 20 may be increased in a desired manner to a desired displacement. As another example, the air conditioning compressor 20 could be set to a predetermined high displacement (e.g., a maximum displacement) before the clutch assembly 16 is disengaged. Engagement and disengagement of the clutch assembly 16 in this manner provides the most rapid engagement and disengagement of the clutch assembly 16, which can reduce wear on the clutch assembly 16.

It will be appreciated that it may be desirable in some situations to provide overload protection in the clutched, driven accessory such that a failure of the accessory portion (in which the input shaft of the accessory portion could not be rotated when a predetermined maximum torque was applied through the clutch assembly to the input shaft) would not cause corresponding non-rotation of the input member 12 (FIG. 1). One means for providing overload protection includes the provision of a torque limiting coupling between the input shaft and the second rotary clutch portion.

Figure 18:
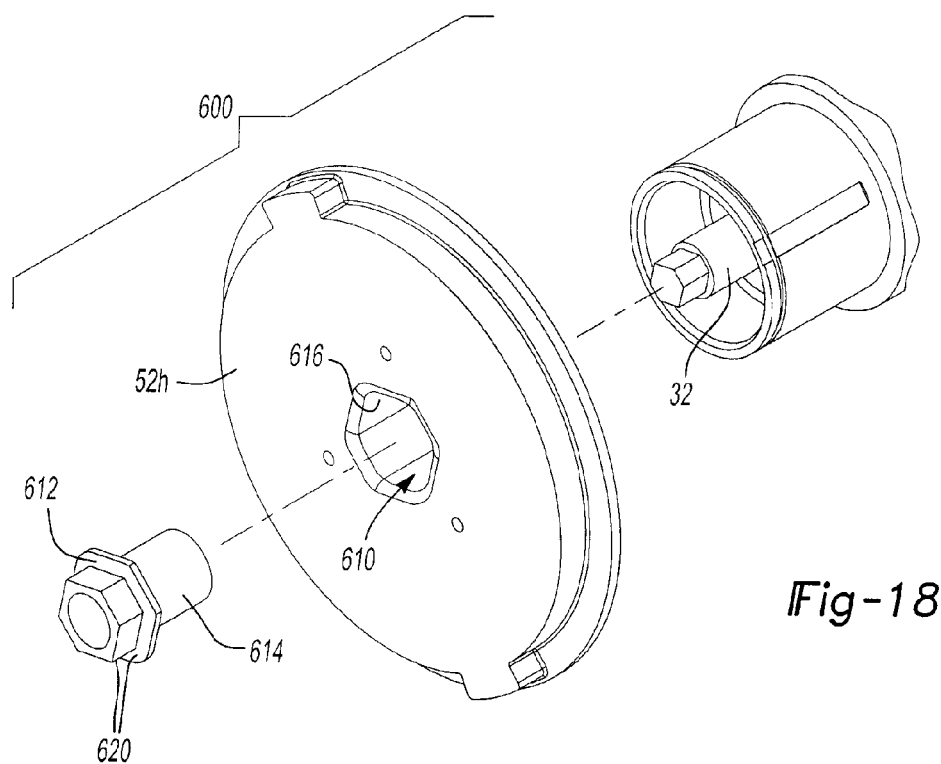
FIG. 18 is an exploded perspective view of a portion of a ninth clutched, driven device or accessory constructed in accordance with the teachings of the present disclosure.
Figure 19:
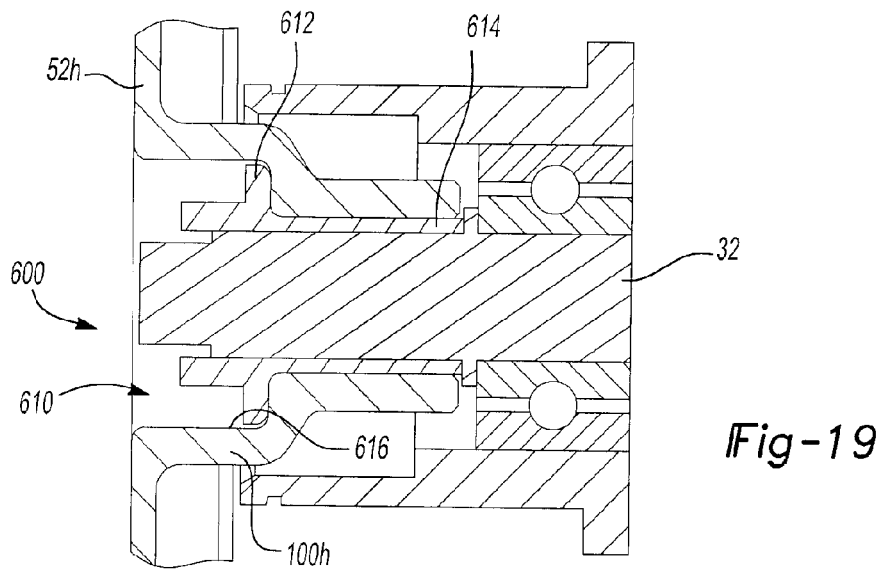
FIG. 19 is a longitudinal section view of a portion of the clutched, driven device of FIG. 18.

With reference to FIGS. 18 and 19, an exemplary torque limiting coupling is generally indicated by reference numeral 600. The torque limiting coupling 600 is configured to couple the second rotary clutch portion 52h to the input shaft 32. In the particular example provided, the remaining portions of the clutched, driven device that are not shown can be identical to those in the example of FIG. 1. It will be appreciated, however, that a torque limiting coupling could be incorporated into any of the previously (above) described clutched, driven devices.

The torque limiting coupling can comprise a non-circular aperture 610 formed in the tubular hub portion 100h and a non-circular flange 612 formed on a nut 614 that is threaded onto the input shaft 32 to fixedly couple the second rotary clutch portion 52h to the input shaft 32. The flange 612 can be received into the aperture 610 and can drivingly engage the sidewall 616 of the aperture 610 to thereby couple the nut 614 to the second rotary clutch portion 52h for rotation therewith. In the particular example provided, the aperture 610 and the flange 612 have corresponding hexagonal shapes, but it will be appreciated that other shapes could be employed in the alternative. To inhibit the transmission of torque between the second rotary clutch portion 52h and the input shaft 32 in excess of a predetermined maximum torque, one or both of the aperture 610 and the flange 612 can be configured to permanently deform to an extent where the flange 612 cannot drivingly engage the sidewall 616 of the aperture 610. In the example provided, the corners 620 of the flange 612 are configured to deform (e.g., yield) such that the flange 612 has a circular shape that cannot drivingly engage the sidewall 612 of the aperture 610. Various other means may be employed including yielding elements or shear elements disposed in a torque path between the second rotary clutch portion and the input shaft.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

| Listing of Elements | |
|---|---|
| Clutched, driven device | 10 |
| Clutched, driven device | 10a |
| Clutched, driven device | 10b |
| Clutched, driven device | 10c |
| Clutched, driven device | 10d |
| Clutched, driven device | 10e |
| Clutched, driven device | 10f |
| Clutched, driven device | 10g |
| Input member | 12 |
| Input member | 12f |
| Accessory portion | 14 |
| Accessory portion | 14f |
| Clutch assembly | 16 |
| Clutch assembly | 16c |
| Clutch assembly | 16f |
| Air conditioning compressor | 20 |
| Supercharger | 20f |
| Pulley sheave | 22 |
| Housing | 30 |
| Housing | 30f |
| Input shaft | 32 |
| Input shaft | 32f |
| Input shaft | 32g |
| Bearing set | 34 |
| Input end | 40 |
| First rotary clutch portion | 50 |
| First rotary clutch portion | 50c |
| First rotary clutch portion | 50f |
| Second rotary clutch portion | 52 |
| Second rotary clutch portion | 52a |
| Second rotary clutch portion | 52c |
| Second rotary clutch portion | 52g |
| Second rotary clutch portion | 52h |
| Bearing | 54 |
| Wrap spring | 56 |
| Wrap spring | 56c |
| Wrap spring | 56f |
| Carrier | 58 |
| Carrier | 58c |
| Retainer | 60 |
| Retainer | 60c |
| Actuator | 62 |
| Actuator | 62c |
| Cap assembly | 64 |
| Actuator mount | 70 |
| Actuator input member | 72 |
| Actuator input member | 72c |
| Actuator input member | 72d |
| Actuator input member | 72f |
| First coil assembly | 74 |
| First coil assembly | 74b |
| First coil assembly | 74f |
| Second coil assembly | 76 |
| Second coil assembly | 76b |
| Second coil assembly | 76f |
| Brake shoe | 78 |
| Brake shoe | 78f |
| Retaining ring | 80 |
| Rotational axis | 86 |
| Rotational axis | 86g |
| Interior clutch surface | 90 |
| Interior clutch surface | 90c |
| Tubular hub | 94 |
| Radial flange | 96 |
| Hub portion | 100 |
| Hub portion | 100h |
| Intermediate portion | 102 |
| Intermediate portion | 102a |
| Mounting portion | 104 |
| Annular mounting rim | 110 |
| Lug | 112 |
| Radial rim | 114 |
| Abutment surface | 120 |
| Lug | 122 |
| Groove | 124 |
| Coupling neck | 130 |
| Coil mount | 132 |
| Pocket | 134 |
| Lip | 136 |
| Lip | 138 |
| First end | 140 |
| Helical coils | 142 |
| Second end | 144 |
| Control tang | 148 |
| Flange portion | 160 |
| Sleeve portion | 162 |
| Groove | 164 |
| Lug recess | 166 |
| Carrier abutment wall | 168 |
| First rear surface | 172 |
| Second rear surface | 174 |
| Front surface | 176 |
| Axial end face | 180 |
| Mounting rim | 188 |
| Front radial rim | 190 |
| Lug clearance recess | 196 |
| Annular body | 200 |
| Annular body | 200c |
| End flange | 202 |
| End flange | 202d |
| Engagement | 210 |
| Slotted aperture | 212 |
| Zone | 218 |
| Protrusion | 220 |
| Exterior surface | 222 |
| Rear surface | 230 |
| Front surface | 232 |
| Shoe member | 240 |
| Cap member | 250 |
| Seal member | 252 |
| Resilient finger | 254 |
| Resilient member | 300 |
| First portion | 302 |
| Second portion | 304 |
| Return spring | 350 |
| Return spring | 350d |
| Shoulder | 360 |
| Spacer | 364 |
| Clutch housing | 400 |
| Stub shaft | 402 |
| Stub shaft bearing | 404 |
| Necked-down portion | 410 |

-continued

| Listing of Elements | |
|---|---|
| Recessed portion | 412 |
| Bushing | 416 |
| Bracket | 420 |
| Axial end face | 430 |
| Decoupler assembly | 500 |
| Input member | 502 |
| Input member | 502g |
| Output member | 504 |
| Bearing | 506 |
| Clutch spring | 508 |
| Clutch carrier | 510 |
| Torsion coupling | 512 |
| Thrust washer | 514 |
| Support bushing | 516 |
| Interior clutch surface | 520 |
| Helical recess | 530 |
| First end | 540 |
| Helical coils | 542 |
| Second end | 544 |
| Flange portion | 560 |
| Sleeve portion | 562 |
| Front surface | 570 |
| Helical groove | 574 |
| Torque limiting coupling | 600 |
| Aperture | 610 |
| Flange | 612 |
| Nut | 614 |
| Sidewall | 616 |

What is claimed is:

1. A driven accessory comprising:
a first rotary clutch portion that is disposed about a rotary axis and adapted to receive a rotary input, the first rotary clutch portion defining a clutch surface;
a second rotary clutch portion that is disposed about the rotary axis and adapted to be coupled to an input shaft;
a wrap spring having a first end, a second end and a plurality of helical coils directly connected to the first end and the second end, at least a portion of the plurality of helical coils engaging the clutch surface, the wrap spring being configured to selectively transmit rotary power between the first rotary clutch portion and the second rotary clutch portion, the rotary power being received by the helical coils from the first rotary clutch portion and being transmitted through the first end; and
an actuator that is selectively operable for generating a drag force that is applied to the second end of the wrap spring, the actuator comprising an actuator input member that is rotatable about the rotary axis relative to the first rotary clutch portion, the actuator input member being axially movable along the rotary axis between a first position, in which the actuator input member is drivingly engaged to the first rotary clutch portion to cause the wrap spring to uncoil against the clutch surface such that rotary power is transmitted between the first rotary clutch portion and the second rotary clutch portion, and a second position in which the actuator input member is disengaged from first rotary clutch portion;
wherein rotary power that is output from the wrap spring to the second rotary clutch portion is transmitted through an axial end face of a wire that forms the first end of the wrap spring, and wherein the axial end face abuts an abutment surface formed on the second rotary clutch portion,
wherein the actuator comprises a first coil assembly and a second coil assembly, wherein the first coil assembly is operable for translating the actuator input member in a first axial direction and the second coil assembly is operable for translating the actuator input member in a second axial direction that is opposite the first axial direction.

2. The driven accessory of claim 1, wherein the actuator input member and the second end of the wrap spring are coupled such that the actuator input member is axially movable independently of the second end of the wrap spring.

3. The driven accessory of claim 1, wherein the actuator input member is selectively movable into a third position in which the actuator input member is frictionally engaged to a nonrotating brake shoe to apply a drag force to the second end of the wrap spring that causes the helical coils of the wrap spring to coil more tightly as the first rotary clutch portion rotates.

4. The driven accessory of claim 1, wherein the second coil assembly is larger than or equal in size to the first coil assembly.

5. The driven accessory of claim 1, further comprising an accessory portion driven by the input shaft, the accessory portion comprising a variable displacement pump.

6. The driven accessory of claim 1, wherein the wrap spring coils away from the clutch surface when the actuator input member is disposed in the second position.

7. The driven accessory of claim 1, further comprising a decoupler assembly disposed in a torque path between the second rotary clutch portion and the input shaft.

8. The driven accessory of claim 7, wherein the decoupler assembly has a clutch spring that axially overlaps the wrap spring.

9. The driven accessory of claim 1, further comprising a carrier and a retainer, the wrap spring being mounted on the carrier, the carrier being coupled to the second rotary clutch portion for common rotation, the retainer being coupled to at least one of the carrier and the second rotary clutch portion to limit movement of at least one of the carrier and the wrap spring in a direction away from the second rotary clutch portion.

10. The driven accessory of claim 9, wherein the second rotary clutch portion has a radial rim that abuts the carrier on a side opposite the retainer.

11. The driven accessory of claim 9, wherein the carrier defines a lug recess, and wherein the second rotary clutch portion includes a lug that is received into the lug recess.

12. The driven accessory of claim 11, wherein the abutment surface is formed on the lug.

13. The driven accessory of claim 1, wherein a slotted aperture is formed in the actuator input member and wherein the second end of the wrap spring forms a control tang that is received into the slotted aperture.

14. The driven accessory of claim 13, wherein the actuator input member comprises an annular body and wherein the slotted aperture is formed in a zone on the annular body that is formed radially outwardly of a remaining portion of the annular body such that the zone defines a protrusion on an exterior surface of the annular body.

15. The driven accessory of claim 1, wherein the second rotary clutch portion comprises a resilient member that is configured to attenuate vibration transmitted through the second rotary clutch portion at one or more predetermined frequencies.

16. The driven accessory of claim 1, wherein the actuator input member is disposed concentrically inside the wrap spring.

* * * * *